United States Patent
Moriyama

(10) Patent No.: US 9,963,924 B2
(45) Date of Patent: May 8, 2018

(54) DOOR SUPPORT STRUCTURE OF AUTOMOTIVE VEHICLE

(71) Applicant: MAZDA MOTOR CORPORATION, Hiroshima (JP)

(72) Inventor: Yukihiro Moriyama, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days. days.

(21) Appl. No.: 15/403,242

(22) Filed: Jan. 11, 2017

(65) Prior Publication Data

US 2017/0241179 A1     Aug. 24, 2017

(30) Foreign Application Priority Data

Feb. 19, 2016   (JP) .................................. 2016-030036

(51) Int. Cl.
| | |
|---|---|
| *E05D 3/10* | (2006.01) |
| *E05F 1/08* | (2006.01) |
| *E05F 1/12* | (2006.01) |
| *B60J 5/04* | (2006.01) |
| *E05D 15/48* | (2006.01) |

(52) U.S. Cl.
CPC ............. *E05F 1/1238* (2013.01); *B60J 5/047* (2013.01); *B60J 5/0472* (2013.01); *E05D 15/48* (2013.01); *E05Y 2900/531* (2013.01)

(58) Field of Classification Search
CPC . E05F 1/123; E05F 1/1238; E05F 7/02; B60J 5/047; B60J 5/0472; E05D 15/48; E05D 15/487; E05D 3/127; E05D 3/125; E05D 3/145; E05D 3/147; E05D 7/00; E05Y 2900/531; E05Y 2900/53; Y10T 16/532; Y10T 16/5323; Y10T 16/547; Y10T 16/5472

See application file for complete search history.

(56) References Cited

U.S. PATENT DOCUMENTS

| | | | | |
|---|---|---|---|---|
| 3,594,853 | A | * 7/1971 | Slattery ..................... | E05D 3/10 16/354 |
| 3,848,293 | A | * 11/1974 | Marchione ................ | E05D 3/10 16/297 |
| 3,956,793 | A | * 5/1976 | Jewell ....................... | E05D 3/10 16/368 |

(Continued)

FOREIGN PATENT DOCUMENTS

| | | |
|---|---|---|
| JP | S63-103729 A | 5/1988 |
| JP | H01-309818 A | 12/1989 |

(Continued)

*Primary Examiner* — Chuck Mah
(74) *Attorney, Agent, or Firm* — Studebaker & Brackett PC

(57) ABSTRACT

A door hinge is provided to slant such that a free end of a door is rotated obliquely upward while the door is opened, and an energizing type balancer to assist an opening/closing operation of the door is provided. A hinge axis of the door hinge slants relative to a vertical line, having an upper side thereof being positioned on an inward side in a vehicle width direction and on a forward side in a vehicle longitudinal direction such that a locus of the free end of the door while the door is opened becomes substantially horizontal or lowers in an opening direction at a point before the door is opened to a maximum open position.

4 Claims, 13 Drawing Sheets

(56) References Cited

U.S. PATENT DOCUMENTS

| | | | | |
|---|---|---|---|---|
| 4,658,475 A * | 4/1987 | Kinaga | ............... | E05D 3/10 16/367 |
| 4,665,587 A * | 5/1987 | Kinaga | ............... | E05D 3/10 16/319 |
| 4,716,623 A * | 1/1988 | Kinaga | ............... | E05D 3/10 16/223 |
| 6,149,222 A * | 11/2000 | Schambre | ............ | E05D 3/10 16/334 |
| 6,314,615 B1 * | 11/2001 | Wolda | ............... | E05D 3/10 16/366 |
| 6,447,043 B1 * | 9/2002 | VandenHeuvel | ...... | B62D 25/12 16/353 |
| 6,817,065 B1 * | 11/2004 | Bruckner | ............ | E05D 3/147 16/366 |
| 6,820,918 B1 * | 11/2004 | DeBono | ............ | B60J 5/0472 16/289 |
| 7,100,245 B2 * | 9/2006 | Wohlfarth | ............ | E05D 3/10 16/367 |
| 2009/0056074 A1 * | 3/2009 | Chase | ............... | E05D 5/062 16/321 |

FOREIGN PATENT DOCUMENTS

| | | |
|---|---|---|
| JP | H02-283526 A | 11/1990 |
| JP | 2004-155276 A | 6/2004 |

* cited by examiner

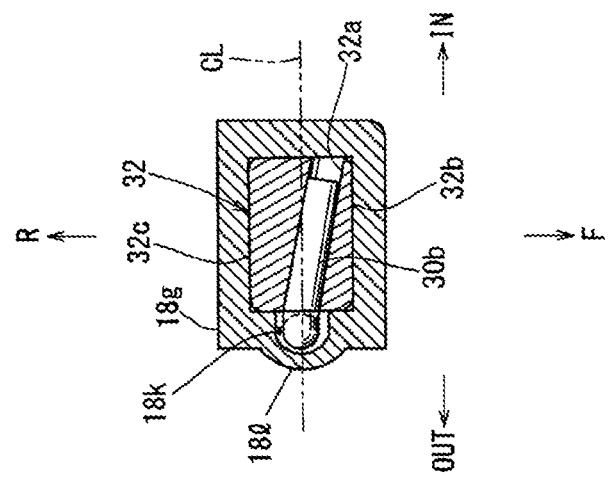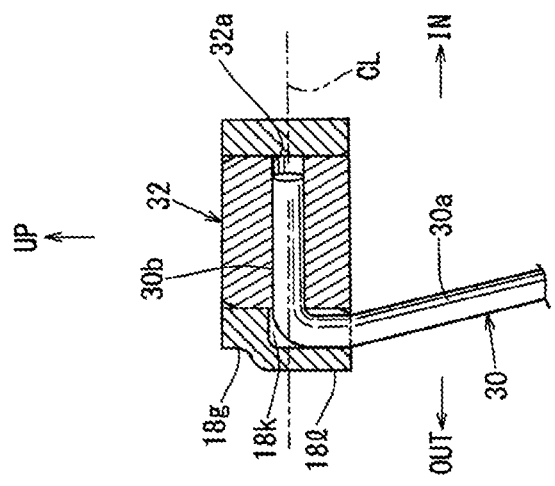

DOOR SUPPORT STRUCTURE OF AUTOMOTIVE VEHICLE

BACKGROUND OF THE INVENTION

The present invention relates to a door support structure of an automotive vehicle, in which a door hinge is provided to slant such that a free end of a door is rotated obliquely upward while the door is opened and an energizing type balancer to assist an opening/closing operation of the door is provided.

Conventionally, it is known in a low-height vehicle, such as a sports car, that the door hinge is provided to slant such that the free end of the door is rotated obliquely upward while the door is opened in order to prevent the door from interfering with a curb. In this case, the energizing type balancer is generally provided for the purpose of assisting the opening/closing operation of the door, and a gas damper is conventionally used as this balancer.

The gas balancer has a merit that its energizing range is properly wide, but it has a problem that it is relatively large-scale, heavy and expensive. Meanwhile, in a case where a coil spring is used as the balancer, there is a problem that it has substantially the same scale as the gas damper and its energizing range is difficult to expand. Therefore, it is required that the rise amount (lift amount) of the door's free end when the door is opened is secured and also the balancer is simplified.

Meanwhile, Japanese Patent Laid-Open Publication No. 2004-155276 discloses a side door structure of a vehicle, in which a hinge axis of a door hinge for a front door slants such that an upper end portion thereof is positioned on an inward side of a vehicle body and also on a forward side of the vehicle body.

In the conventional structure disclosed in the above-described patent document, however, there is a merit that the front door can be effectively prevented from interfering with a rear door which constitutes a double-door type together with the front door, but there is a problem that a rotational locus of the door's free end and simplification of the balancer are not considered, so that there is room for improvement.

SUMMARY OF THE INVENTION

Accordingly, an object of the present invention is to provide a door support structure of an automotive vehicle which can secure the rise amount (lift amount) of the door's free end when the door is opened, thereby preventing the door from interfering with the curb, and achieve the simplification of the balancer.

The present invention is a door support structure of an automotive vehicle, comprising a door hinge pivotally supporting a door, the door hinge being provided to slant such that a free end of the door is rotated obliquely upward while the door is opened, and an energizing type balancer assisting an opening/closing operation of the door, wherein a hinge axis of the door hinge slants relative to a vertical line, having an upper side thereof being positioned on an inward side in a vehicle width direction and on a forward side in a vehicle longitudinal direction such that a locus of the free end of the door while the door is opened becomes substantially horizontal or lowers in an opening direction at a point before the door is opened to a maximum open position.

According to the present structure, since the hinge axis slants inward and also forward, the rise amount (lift amount) of the door's free end when the door is opened can be secured, so that the door can be prevented from interfering with the curb. Further, since the locus of the free end of the door while the door is opened becomes substantially horizontal or lowers in the opening direction at the point before the door is opened to the maximum open position, an operational force for opening the door becomes properly small, so that the simplification of the balancer can be achieved.

Herein, the inward-slant structure of the hinge axis particularly contributes to securing the rise amount (lift amount) of the door's free end when the door is opened, and the forward-slant structure of the hinge axis particularly contributes to making the locus of the door's free end become substantially horizontal or lower in the opening direction at the point before the door is opened to the maximum open position.

In an embodiment of the present invention, an inward-slant angle of the hinge axis relative to the vertical line is set to be within 5-15 degrees and a forward-slant angle of the hinge axis relative to the vertical line is set to be within 5-15 degrees.

According to this embodiment, the rise of the door's free end when the door is opened and the opening operability of the door can be balanced at a high level. In this connection, in a case where the inward-slant angle is less than 5 degrees, the sufficient rise amount (lift amount) of the door's free end when the door is opened cannot be secured. Inversely, in a case where the inward-slant angle exceeds 15 degrees, the door opening operational force becomes so heavy that the balancer needs to be large-scale and also a vehicle-body structure is influenced badly, such as a cabin space being narrower.

Meanwhile, in a case where the forward-slant angle is less than 5 degrees, it is impossible to sufficiently secure the maximum open position until the horizontal direction. Inversely, in a case where the forward-slant angle exceeds 15 degrees, it is necessary to provide a door rotational space on the side of a front fender. Accordingly, a hinge structure to avoid the vehicle body, like a swan hinge, is required, so that the vehicle-body structure is influenced badly. Furthermore, when the door is opened, the door's free end starts lowering, without rising. Therefore, the above-described embodiment configured such that the inward-slant angle and the forward-slant angle are set to be within the above-described ranges can avoid the above-described various kinds of problem, thereby balancing the rise of the door's free end when the door is opened and the opening operability of the door at the high level.

In another embodiment of the present invention, the balancer is made of a torsion bar, the torsion bar being configured to take a neutral position thereof where no torsional energizing force is generated at a top dead center of the locus of the free end of the door.

According to this embodiment, the door closing can be assisted by means of a torsional energizing force of the torsion bar even when pulling back (closing) the door from its maximum open position.

Other features, aspects, and advantages of the present invention will become apparent from the following description which refers to the accompanying drawings.

BRIEF DESCRIPTION OF THE DRAWINGS

FIG. 11A is a sectional view showing another embodiment of the engagement structure of the connecting member provided at the upper end of the torsion bar and the attachment portion of the door-side hinge member, and FIG. 11B is a plan view of FIG. 11A.

DETAILED DESCRIPTION OF THE INVENTION

Figure 1:
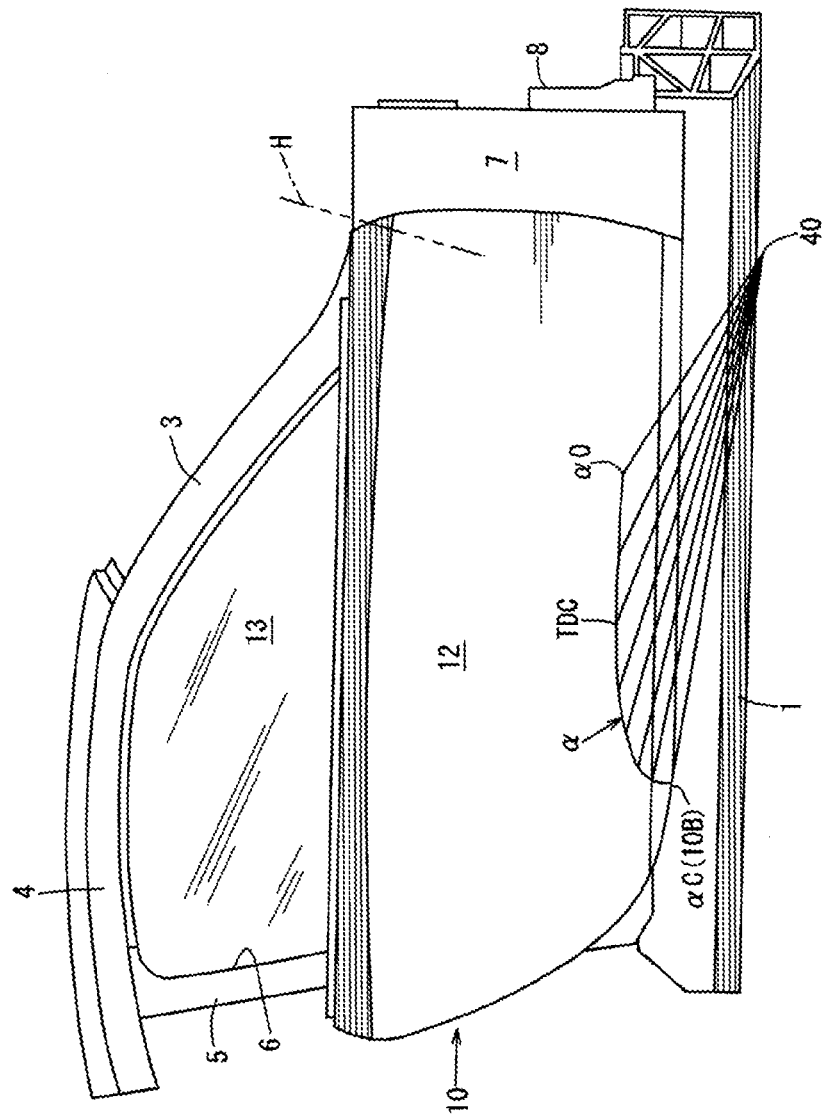
FIG. 1 is an exterior side view showing a door support structure of an automotive vehicle of the present invention.
Figure 2:
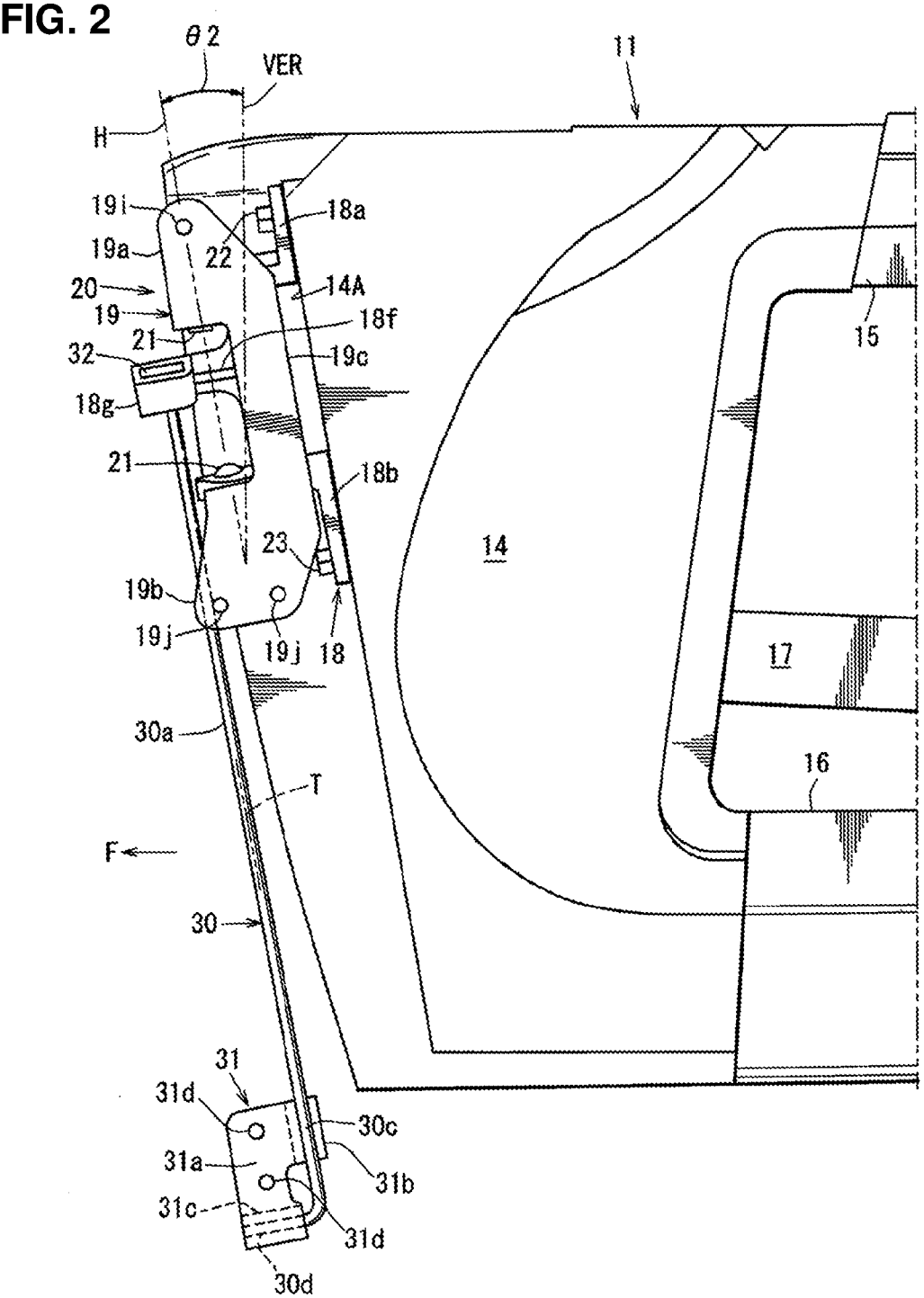
FIG. 2 is a side view showing the door support structure, when viewed from an inward side in a vehicle width direction.
Figure 3:
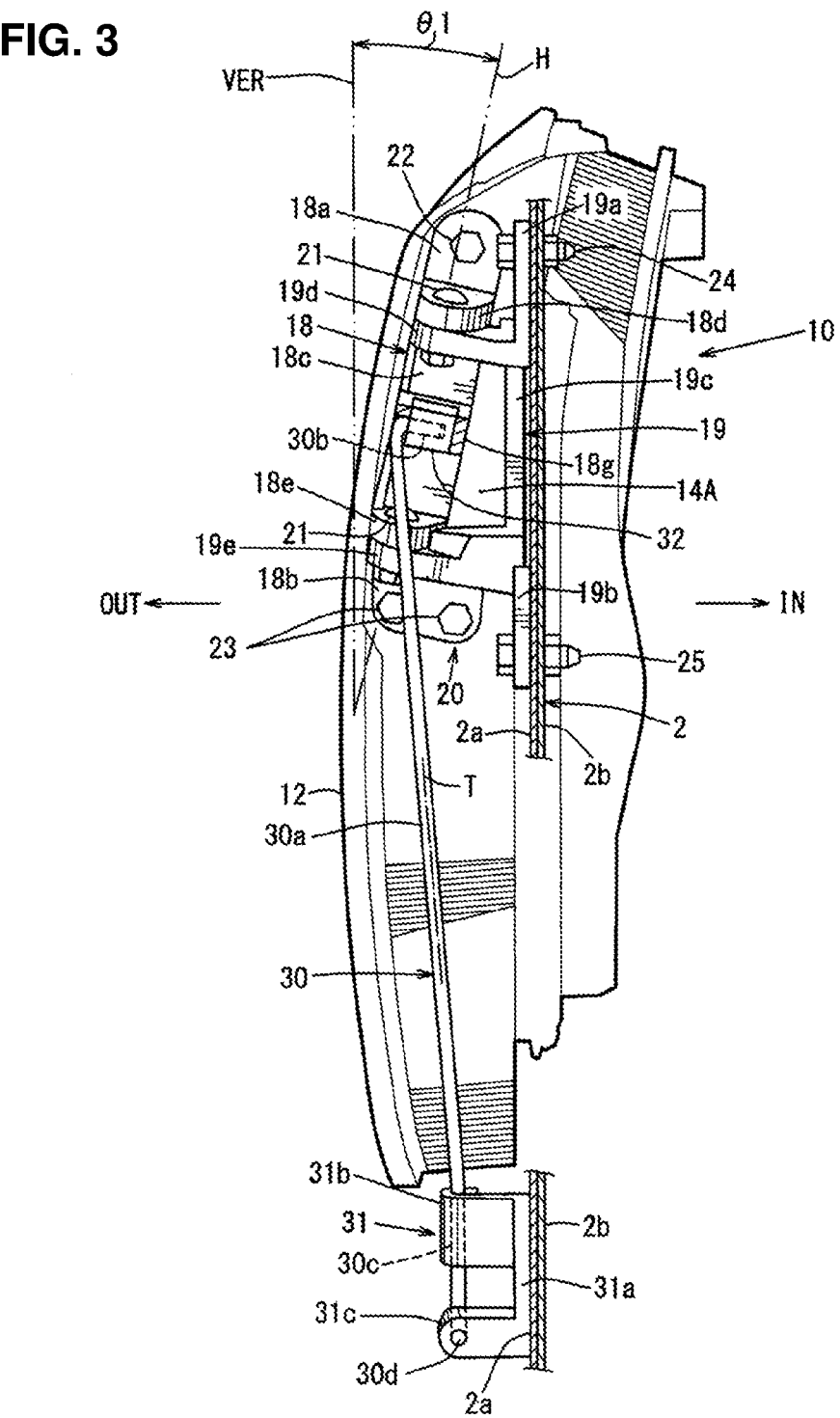
FIG. 3 is a front view of the door support structure, when viewed from a forward side of the vehicle.
Figure 4:
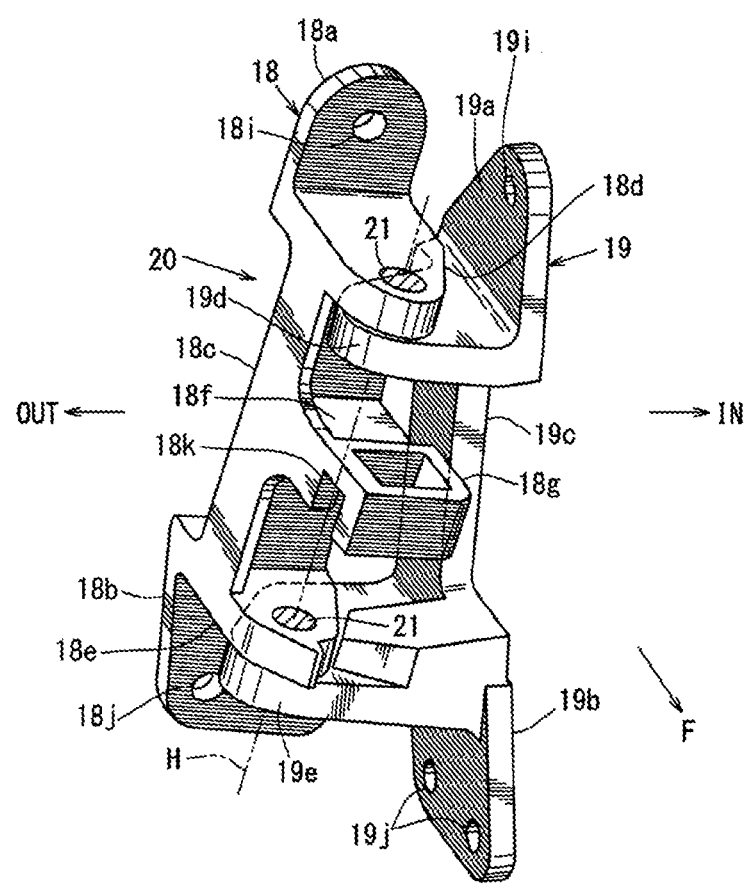
FIG. 4 is a perspective view showing an assembly structure of a door-side hinge member and a vehicle-body-side hinge member.
Figure 5:
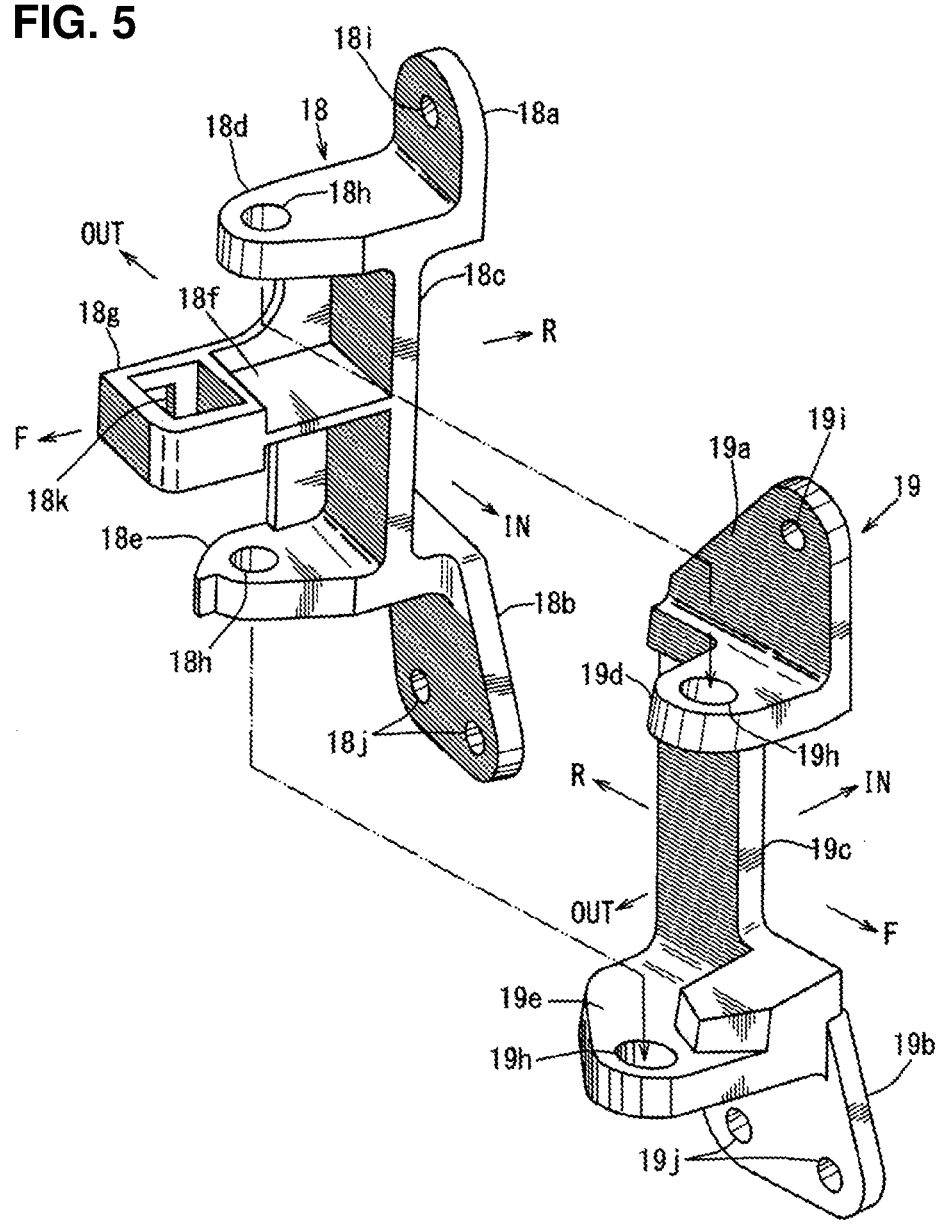
FIG. 5 is an exploded perspective view showing the door-side hinge member and the vehicle-body-side hinge member.
Figure 6:
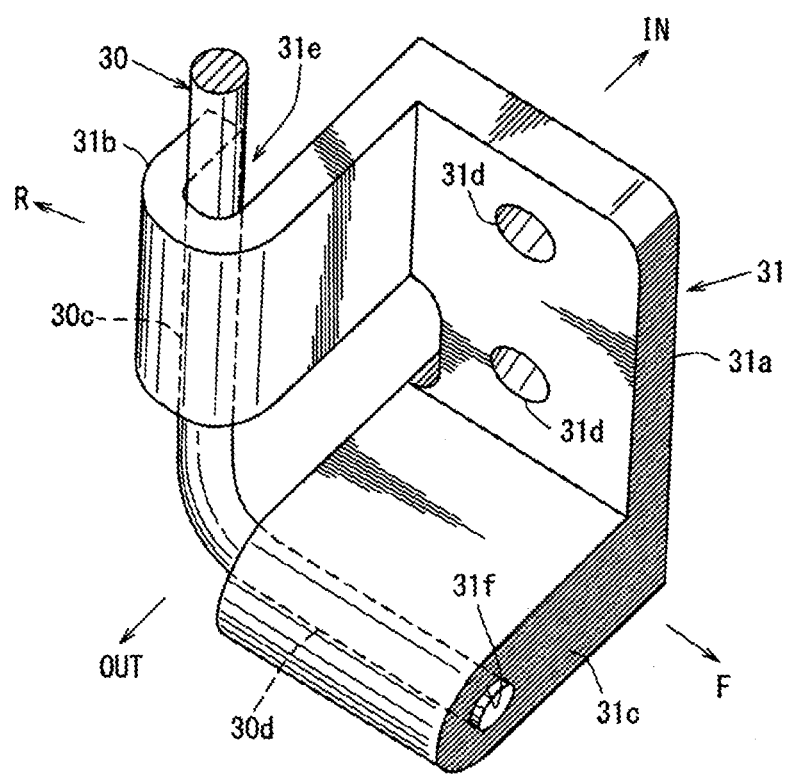
FIG. 6 is a perspective view of a vehicle-body-side bracket.
Figure 7B:
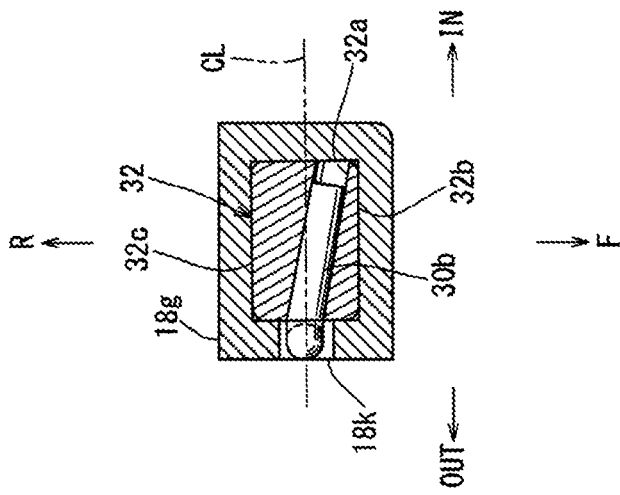
FIG. 7B is a plan view of FIG. 7A.
Figure 7A:
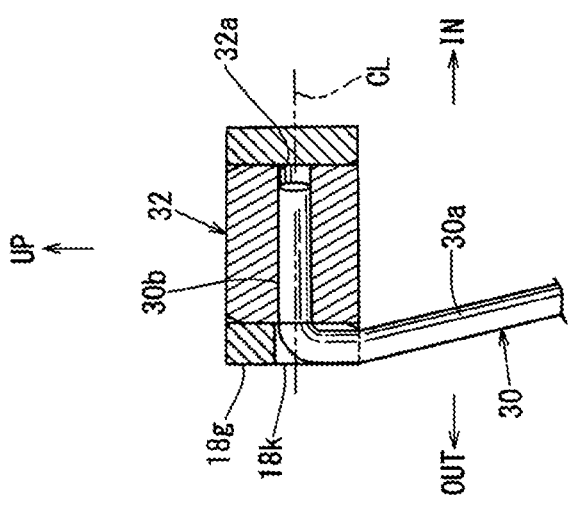
FIG. 7A is an enlarged sectional view showing an engagement structure of a connecting member provided at an upper end of a torsion bar and an attachment portion of the door-side hinge member.

Hereafter, an embodiment of the present invention will be described referring to the drawings. The drawings show a door support structure of an automotive vehicle, and FIG. 1 is its exterior side view, FIG. 2 is a side view showing the door support structure, when viewed from an inward side in a vehicle width direction, FIG. 3 is a front view of the door support structure, when viewed from a forward side of the vehicle, FIG. 4 is a perspective view showing an assembly structure of a door-side hinge member and a vehicle-body-side hinge member, FIG. 5 is an exploded perspective view of these hinge members, FIG. 6 is a perspective view of a vehicle-body-side bracket, FIG. 7A is an enlarged sectional view showing an engagement structure of a connecting member provided at an upper end of a torsion bar and an attachment portion of the door-side hinge member and FIG. 7B is a plan view of FIG. 7A, FIG. 8 is a side view showing the door in an open state (a door opening angle of 60 degrees), FIG. 9 is a front view showing the door in the open state (the door opening angle of 60 degrees), and FIG. 10 is a plan view showing the door in the open state (the door opening angle of 60 degrees).

A vehicle-body-side structure will be described referring to FIGS. 1, 8, 9 and 10, first. A side sill 1 which has a closed cross section extending in a vehicle longitudinal direction is provided at a side portion of a vehicle body. A hinge pillar 2 which has a closed cross section extending in a vehicle vertical direction is fixed to a front portion of the side sill 1.

Further, a front pillar 3 which has a closed cross section extending from an upper end of the hinge pillar 2 obliquely upward and rearward, curving smoothly, is provided. A roof side rail 4 which has a closed cross section extending rearward continuously from the front pillar 3 is provided at a rear end of the front pillar 3.

Figure 8:
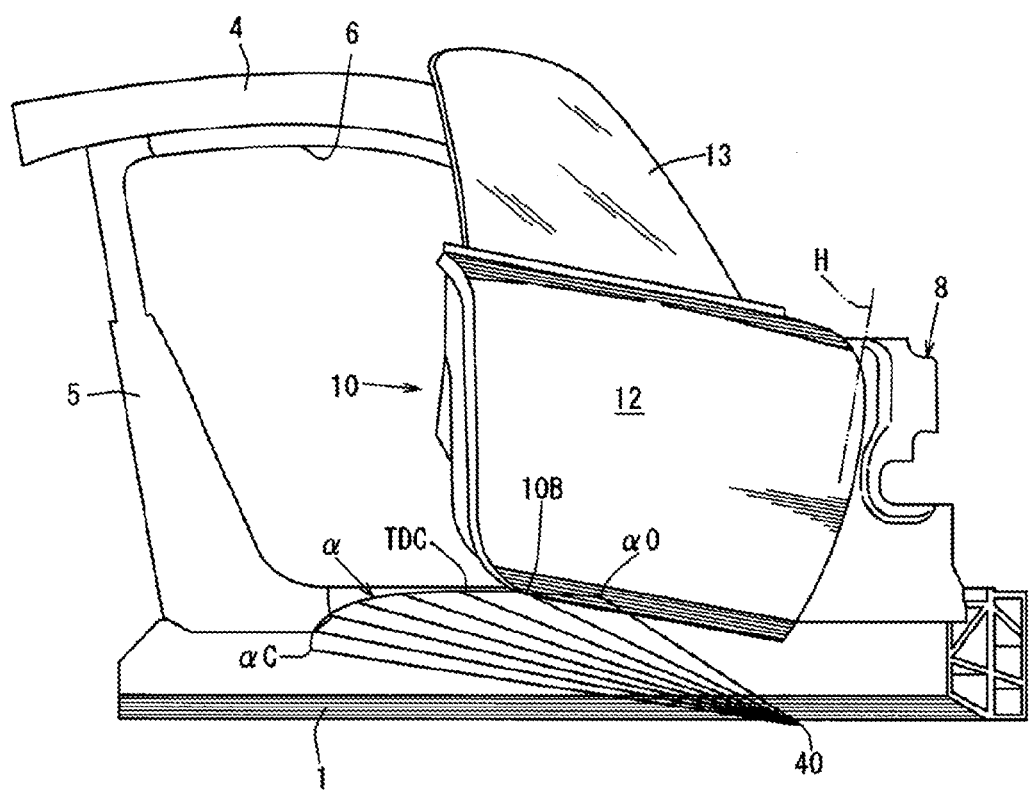
FIG. 8 is a side view showing the door in an open state.
Figure 9:
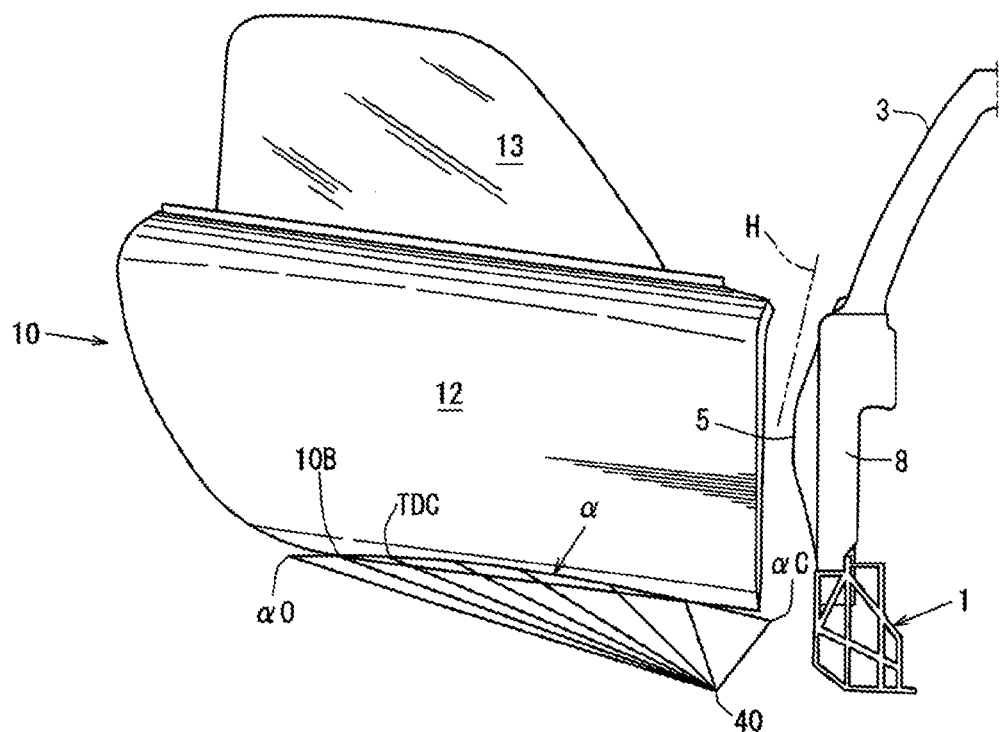
FIG. 9 is a front view showing the door in the open state.
Figure 10:
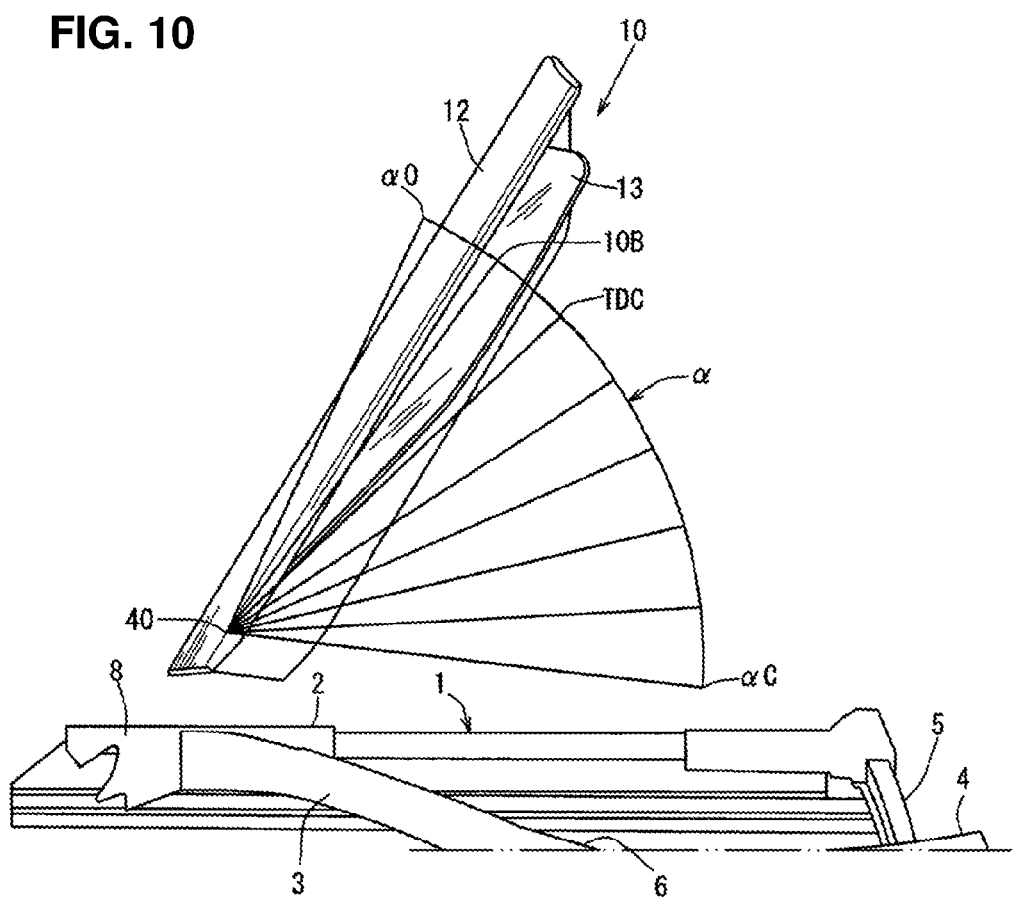
FIG. 10 is a plan view showing the door in the open state.

As shown in FIGS. 8 and 10, at a position which is spaced rearward apart from the hinge pillar 2 is provided a center pillar 5 which has a closed cross section connecting the lower-side roof side rail 4 and the lower-side side sill 1 in the vertical direction, so that a door opening portion 6 (a right-side door opening portion for ingress/egress of a front seat's passenger is shown in the figures) which is enclosed by the side sill 1, the hinge pillar 2, the front pillar 3, the roof side rail 4, and the center pillar 5 is formed.

Herein, reference character 7 denotes a front fender and reference character 8 denotes an apron panel in the figures. The above-described hinge pillar 2, part of which is shown in FIG. 3, comprises a hinge pillar outer panel 2a, a hinge pillar reinforcement 2b, and a hinge pillar inner panel, not illustrated, which is a vehicle-body strength member which has a pillar closed cross section extending in the vehicle vertical direction.

Next, a door-side structure will be described referring to FIGS. 1, 2 and 3. A front door 10 (the right-side front door 10 is shown in the figures, which will be referred to as the "door" simply) as a side door to open or close the above-described door opening portion 6 comprises a door frame 11 shown in FIG. 2, a synthetic-resin made door outer panel 12 which is provided on an outward side, in the vehicle width direction, of the door frame 11, and a door window glass 13 which is configured to be elevated or lowered by a window regulator device, not illustrated.

The door frame 11 shown in FIG. 2 comprises a front-side vertical frame member 14 which constitutes a door front side portion, a rear-side vertical frame member (not illustrated) which constitutes a door rear side portion, a door-beltline constituting member 15 which connects respective upper ends of these front-side and rear-side vertical frame members in the vehicle longitudinal direction, a lower connecting member 16 which connects respective lower ends of the front-side and rear-side vertical frame members in the vehicle longitudinal direction, and an impact bar 17 which is provided to obliquely extend in the vehicle longitudinal direction between respective middle positions, in the vertical direction, of the front-side and rear-side vertical frame members such that a front side thereof is located at a higher level than a rear side thereof. Herein, the above-described door-beltline constituting member 15 constitutes a door upper side portion, the above-described lower connecting member 16 constitutes a door lower side portion, and the above-described impact bar 17 is a member to receive a side-collision load.

Further, the above-described front-side and rear-side vertical frame members are made of light-alloy or light-metal casting, for example, whereas the door-beltline constituting member 15, the lower connecting member 16, and the impact bar 17 are made of light-alloy or light-metal extrusion molding, for example.

As shown in FIG. 2, a hinge attachment face 14A is integrally formed at a front portion of the front-side vertical frame member 14. This hinge attachment face 14A slants, in a vehicle side view, such that an upper side thereof is positioned forward, which is arranged in parallel to a hinge axis H which will be described later.

Next, the door support structure of the automotive vehicle will be described specifically. As shown in FIGS. 2 and 3, the above-described door 10 is supported at the hinge pillar 2 as a vehicle-body-side member via a door hinge 20 which is provided with a door-side hinge member 18 and a vehicle-body-side hinge member 19 so that it can be opened or closed.

In the present embodiment, as shown in FIGS. 2 and 3, the door hinge 20 is provided to slant such that a free end of the door 10, particularly a free-end lower portion 10B (see FIG. 1) of the door 10 is rotated obliquely upward while the door 10 is opened, and also a torsion bar 30 which is a spring as an energizing type balancer assisting an opening/closing operation of the door is provided.

Hereinafter, respective structures of the door-side hinge member 18 and the vehicle-body-side hinge member 19 which jointly support the door 10 at the vehicle body will be described referring to FIGS. 4 and 5. As shown in FIGS. 4 and 5, the door-side hinge member 18 comprises upper-and-lower attaching seats 18a, 18b, a connection portion 18c which connects these upper-and-lower attachment seats 18a, 18b in the vertical direction, a protrusion portion 18d which protrudes forward from a lower end of the upper attachment seat 18a, another protrusion portion 18e which protrudes forward from an upper end of the lower attachment seat 18b, an arm portion 18f which protrudes forward from a middle portion, in the vertical direction, of the connection portion 18c, and a frame portion 18g (an attachment portion for attaching an upper end of the torsion bar 30) which is provided at a front end of the arm portion 18f, which are formed integrally.

The upper-and-lower protrusion portions 18d, 18e have pin holes 18h into which a hinge pin 21 (see FIGS. 2-4) which comprises bolt and nut or the like is inserted. The upper attachment seat 18a has a single attachment hole 18i, and the lower attachment seat 18b has plural attachment holes 18j, 18j, and these attachment seats 18a, 18b are fixedly fastened to the hinge attachment face 14A of the vertical frame member 14 by fastening members 22, 23, such as bolt and nut, which use the attachment holes 18i, 18j, 18j for fastening (see FIGS. 2 and 3). The above-described frame portion 18g is configured to protrude forward beyond respective front ends of the upper-and-lower protrusion portions 18d, 18e, considering assembling of the door-side hinge member 18 to the vehicle-body-side hinge member 19 from above.

As shown in FIGS. 4 and 5, the vehicle-body-side hinge member 19 comprises upper-and-lower attachment seats 19a, 19b, a connection portion 19c which connects these attachment seats 19a, 19b in the vertical direction, a protrusion portion 19d which protrudes outward, in the vehicle width direction, from a lower end of the upper attachment seat 19a, and another protrusion portion 19e which protrudes outward, in the vehicle width direction, from an upper end of the lower attachment seat 19b, which are formed integrally.

The upper-and-lower protrusion portions 19d, 19e have pin holes 19h into which the hinge pin 21 (see FIGS. 2-4) which comprises bolt and nut or the like is inserted. The upper attachment seat 19a has a single attachment hole 19i, and the lower attachment seat 19b has plural attachment holes 19j, 19j, and as shown in FIG. 3, these attachment seats 19a, 19b and the hinge pillar outer panel 2a and the hinge pillar reinforcement 2b of the hinge pillar 2 are fixedly fastened together by fastening members 24, 25, such as bolt and nut, which use the attachment holes 19i, 19j.

The door hinge 20 composed of the door-side hinge member 18 and the vehicle-body-side hinge member 19 is a single door hinge, differently from a conventional door hinge which comprises a pair of upper-an-lower members and is relatively small, and this single door hinge 20 is attached to an upper-side portion of the door 10. In other words, the door-side hinge member 18 is attached at an upward offset position, so that an attachment space for the torsion bar 30 having a relatively-longer length is secured by using an excessive space between the door 10 and the hinge pillar 2.

The torsion bar 30 assists the opening/closing operation of the door, and as shown in FIG. 3, this torsion bar 30 is provided to extend in the vertical direction along the hinge pillar 2. A lower portion of the torsion bar 30 is fixed to a lower portion of the hinge pillar 2 as the vehicle body by using the vehicle-body-side bracket 31.

The above-described torsion bar 30 is configured, as shown in FIGS. 2 and 3, such that its body portion 30a extends roughly in the vertical direction, an upper-end bending portion 30b which is bent inward, in the vehicle width direction, is integrally provided at an upper end of the body portion 30a, and a lower-end bending portion 30d which is bent forward, in the vehicle longitudinal direction, is integrally provided at an end portion of a lower portion 30c of the torsion bar 30 as shown in FIG. 6.

As shown in FIG. 6, the above-described vehicle-body-side bracket 31 comprises an attachment seat 31a which is provided along an outward face, in the vehicle width direction, of the hinge pillar 2, an engagement portion 31b which extends outward, in the vehicle width direction, from a rear portion of the attachment portion 31a and then is bent inward for engaging the lower portion 30c of the torsion bar 30, and a hold portion 31c which extends outward, in the vehicle width direction, from a lower end of the attachment seat 31a, which are formed integrally.

The above-described attachment seat 31a has plural attachment holes 31d, 31d which are spaced apart from each other in the vertical direction, the above-described engagement portion 31b has an engagement groove 31e which engages with the lower portion 30c of the torsion bar 30, and the above-described holding portion 31c has a holding hole 31f into which the lower-end bending portion 30d of the torsion bar 30 is inserted.

As shown in FIG. 3, the attachment seat 31a of the above-described vehicle-body-side bracket 31 is fixedly fastened together with the hinge pillar outer panel 2a and the hinge pillar reinforcement 2b of the hinge pillar 2 by a fastening member (not illustrated), such as bolt and nut.

The lower portion of the torsion bar 30 provided with the lower portion 30c engaging with the engagement portion 31b and the lower-end bending portion 30d held by the holing portion 31c is fixed to the hinge pillar 2 as the vehicle body via the vehicle-body-side bracket 31.

As shown in FIG. 3, at the hinge attachment face 14A of the door 10 are provided the door-side hinge member 18 which is attached to the vehicle-body-side hinge member 19 from above and the above-described frame portion 18g as a torsion-bar attachment portion which is connected to a torsion-bar connecting member 32 (hereafter, referred to as the "connecting member 32" simply) provided at the upper-end bending portion 30b of the torsion bar 30 from above so that its rotation occurring in a torsional direction can be restricted.

As shown in FIG. 3, the relatively-long torsion bar 30 is arranged compactly along the vertically-long hinge pillar 2 by positioning the torsion bar 30 along the hinge pillar 2. Further, the assemblability of the door 10 to the vehicle body is improved by assembling the door-side hinge member 18 to the vehicle-body-side hinge member 19 from above and connecting the frame portion 18g to the connecting member 32 provided at the upper portion of the torsion bar 30 from above as shown in FIG. 5. Thereby, securing of the length of the torsion bar 30 and securing of the assemblability are attained compatibly, and the opening/closing operation of the door 10 can be made easy without using the conventional gas damper. Moreover, the above-described torsion bar 30 assists the opening/closing operation of the door 10, and the strength against the stress of the torsion bar 30 is improved by ensuring the length of the torsion bar 30.

Further, as shown in FIGS. 4 and 5, the frame portion 18g as the torsion-bar attachment portion is integrally formed at the door-side hinge member 18, so that the number of parts (components) is reduced and it is unnecessary to reinforce the frame portion on the side of the door 10, thereby reducing the stress acting on the door body.

As shown in FIG. 1 showing the fully-closed door state and FIGS. 8, 9 and 10 showing the 60-degree-angle door open state, the door 10 of the present embodiment has a rotational range (see its rotational locus α) from a fully-closed position αC to a fully-open position αO having a rotational center 40. A neutral position of the torsion bar 30 is provided within the rotational range from the fully-closed position αC to the fully-open position αO of the door 10, the door 10 (including the door-side hinge member 18, the frame portion 18g) is assembled from above to the vehicle body (including the hinge pillar 2, the connecting member 32 provided at the upper portion of the torsion bar 30) by using the neutral position of the torsion bar 30. Thereby, the present embodiment is configured such that assembling of the door 10 is easy.

As shown in FIG. 7, the connecting member 32 provided at the upper-end bending portion 30b of the torsion bar 30 is formed in a cuboid shape, and a through engaging hole 32a with which the above-described upper-end bending portion 30b engages is formed at the connecting member 32.

The engaging hole 32a, with which the upper-end bending portion 30b of the torsion bar 30 engages in a direction crossing a torsional axis T (see FIGS. 2 and 3) of the torsion bar 30, is provided to be offset from or to slant relative to a center (see a center line CL) of the connecting member 32 (being provided to slant relative to the center in the embodiment shown in FIG. 7).

The connecting member 32 is configured to engage with the frame portion 18g, having plural different angles because the connecting member 32 is formed in the cuboid shape. Further, since the engaging hole 32a is configured to slant relative to the center line CL, the torsional angle of the torsion bar 30 changes according to the engaging angle of the connecting member 32 and the frame portion 18g. Thereby, the energizing force of the torsion bar 30 is easily adjustable by changing the engaging angle of the connecting member 32 relative to the frame portion 18g.

Herein, at the above-described frame portion 18g is formed an attachment space 18k which is capable of attaching a corner portion at the upper end of the torsion bar 30 by preventing interference of the corner portion at the upper end of the torsion bar 30 with the frame portion 18g when the frame portion 18g is moved from an upper side to a lower side, thereby attaching the connecting member 32 provided at the upper end of the torsion bar 30.

Further, since the connecting member 32 has the engaging hole 32a extending in the direction crossing the torsional axis T of the torsion bar 30 and the engaging hole 32a is provided to slant relative to the center line CL of the connecting member 32 as described above, the energizing force of the torsion bar 30 is surely adjustable by rotating the connecting member 32 so as to change the engagement angle of the connecting member 32 with the frame portion 18g (changing the engagement angle of 180 degrees in the embodiment shown in FIG. 7).

Further, since contact faces 32b, 32c for the frame portion 18g of the connecting member 32 are formed in a rectangular shape by forming the connecting member 32 in the cuboid shape in the present embodiment, the torsional load of the torsion bar 30 is received by the frame portion 18g which faces the rectangular-shaped contact faces 32b, 32c, so that the engagement strength of the both members 32, 18g is improved.

Moreover, in the present embodiment, the hinge axis H of the door hinge 20 slants relative to a vertical line VER, having its upper side being positioned on the inward side in the vehicle width direction with an inward-slant angle θ1 (see FIG. 3) and on the forward side in the vehicle longitudinal direction with an forward-slant angle θ2 (see FIG. 2), such that the rotational locus α (the rotational locus of the free-end lower portion 10B of the door 10 is shown in the figures) of the free end of the door 10 while the door 10 is opened becomes substantially horizontal or lowers in an opening direction at a point before the door is opened to a maximum open position (see the fully-open position αO) as shown in FIGS. 8 and 9.

As shown in FIGS. 2 and 3, since the hinge axis H slants inward by the inward-slant angle θ1 and also slants forward by the forward-slant angle θ2, a rise amount (lift amount) of the door's free end when the door 10 is opened is secured, so that the door is prevented from interfering with a curb.

Further, since the locus α of the free end of the door 10 while the door 10 is opened becomes substantially horizontal or lowers in the opening direction at the point before the door is opened to the fully-open position αO as the maximum open position, an operational force for opening the door 10 becomes small, so that the simplification of the torsion bar 30 is achieved.

Herein, the above-described inward-slant structure of the hinge axis H particularly contributes to securing the rise amount (lift amount) of the door's free end when the door 10 is opened, and the above-described forward-slant structure of the hinge axis H particularly contributes to making the locus α of the door's free end become substantially horizontal or lower in the opening direction at the point before the door 10 is opened to the maximum open position (see the fully-open position αO).

As shown in FIG. 3, the above-described inward-slant angle θ1 is set to be within 5-15 degrees, preferably 12 degrees, and as shown in FIG. 2, the above-described forward-slant angle θ2 is set to be within 5-15 degrees, preferably 10 degrees. Thereby, the rise of the door's free end when the door 10 is opened and the opening operability of the door 10 are balanced at a high level.

That is, in a case where the inward-slant angle θ1 is less than 5 degrees, the sufficient rise amount (lift amount) of the door's free end when the door 10 is opened cannot be secured. Inversely, in a case where the inward-slant angle exceeds 15 degrees, the door opening operational force becomes so heavy that the torsion bar 30 needs to be large-scale and also a vehicle-body structure is influenced badly, such as a cabin space being narrower.

Meanwhile, in a case where the forward-slant angle is less than 5 degrees, it is impossible to sufficiently secure the maximum open position (the fully-open position αO) until the horizontal direction. Inversely, in a case where the forward-slant angle θ2 exceeds 15 degrees, it is necessary to provide a door rotational space on the side of a front fender.

Accordingly, a hinge structure to avoid the vehicle body, like a swan hinge, is required, so that the vehicle-body structure is influenced badly. Furthermore, when the door is opened, the door's free end starts lowering, without rising. Therefore, the above-described embodiment configured such that the inward-slant angle θ1 and the forward-slant angle θ2 are set to be within the above-described ranges avoids the above-described various kinds of problem, thereby balancing the rise of the door's free end when the door is opened and the opening operability of the door at the high level.

Moreover, since the torsion bar 30 is configured to take a neutral position thereof where no torsional energizing force is generated at a top dead center (TDC) of the rotational locus α (see FIGS. 1, 8-10) of the free end of the door 10, the door closing is assisted by means of the torsional energizing force of the torsion bar 30 even when pulling back (closing) the door 10 from its maximum open position (the fully-open position αO). Herein, in a case where the door 10 is assembled to the vehicle body from above, the assemblability of the door 10 becomes appropriate by matching the above-described top dead center TDC of the door 10 with the neutral position of the torsion bar 30.

Next, other embodiments will be described referring to FIGS. 11, 12 and 13. FIG. 11A is a sectional view showing another embodiment of the engagement structure of the connecting member 32 provided at the upper end of the torsion bar 30 and the frame portion 18g of the door-side hinge member 18, and FIG. 11B is a plan view of FIG. 11A. In the structure shown in FIGS. 11A and 11B, an outward side, in the vehicle width direction, of the attachment space 18k is covered with a reinforcement portion 18l in addition to the structure shown in FIGS. 7A and 7B.

Since the structure shown in FIGS. 11A and 11B performs substantially the same operations/effects as the embodiment shown in FIGS. 7A and 7B, the same parts as those shown in FIGS. 7A and 7B are denoted by the same reference characters, and their specific descriptions are omitted here.

Figure 12:
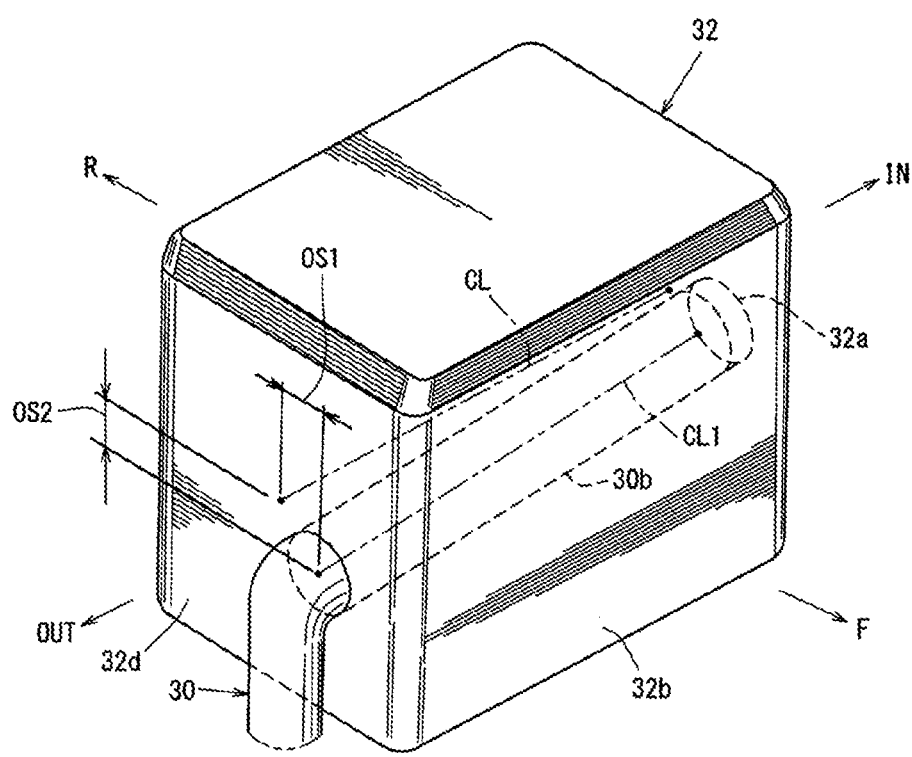
FIG. 12 is an enlarged view showing another embodiment of the connecting member provided at the upper end of the torsion bar.

FIG. 12 is an enlarged view showing another embodiment of the connecting member 32 provided at the upper end of the torsion bar 30. In this embodiment, the upper-end bending portion 30b is inserted into the connecting member 32 for engagement from a specified position at an engagement-base-side end face 32d which is forward offset from the center line CL by an offset amount OS1 and also downward offset from the center line CL by another offset amount OS2. Further, a center line CL1 of the upper-end bending portion 30b of this embodiment is configured to be nonparallel to the center line CL of the connecting member 32.

Since the energizing force of the torsion bar 30 can be surely adjusted by rotating the connecting member 32 and thereby changing the engagement angle of the connecting member 32 with the frame portion 18g, the same parts as the structure shown in FIG. 12 are denoted by the same reference characters and their specific descriptions are omitted here.

Figure 13B:
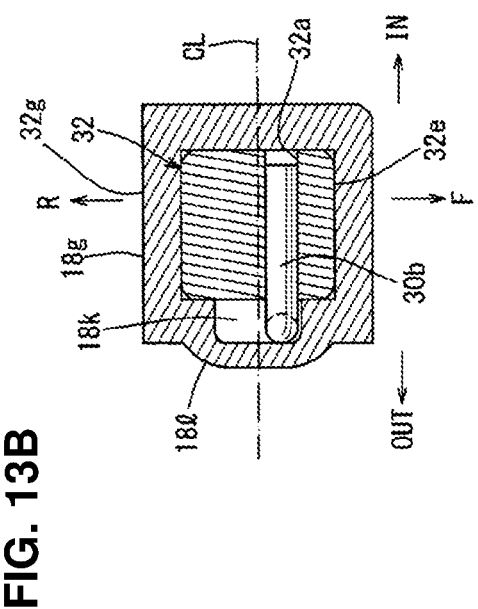
FIG. 13B is a plan view of FIG. 13A.
Figure 13C:
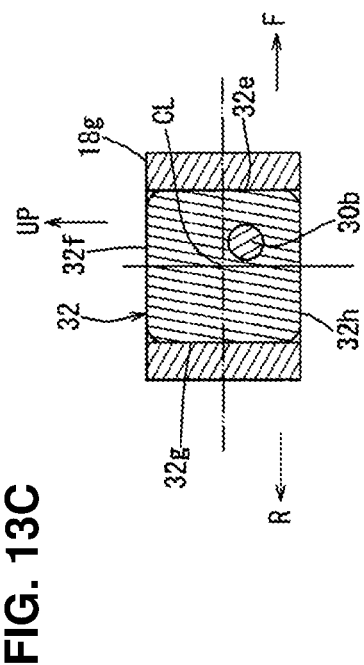
FIG. 13C is a sectional view taken along line A-A of FIG. 13A.
Figure 13A:
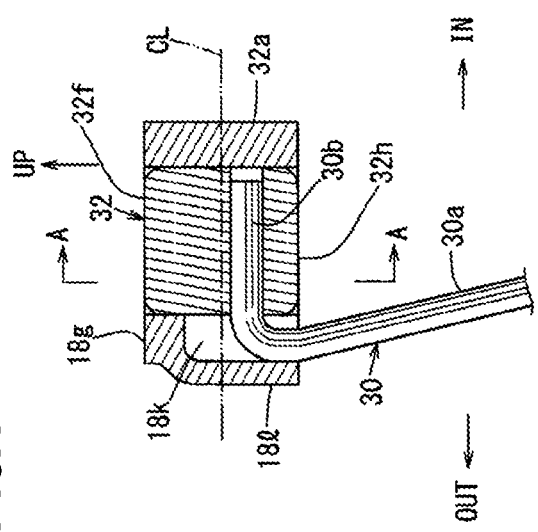
FIG. 13A is a sectional view showing further another embodiment of the engagement structure of the connecting member provided at the upper end of the torsion bar and the attachment portion of the door-side hinge member.

FIG. 13A is a sectional view showing further another embodiment of the engagement structure of the connecting member 32 provided at the upper end of the torsion bar 30 and the frame portion 18g of the door-side hinge member 18, FIG. 13B is a plan view of FIG. 13A, and FIG. 13C is a sectional view taken along line A-A of FIG. 13A.

In the embodiment shown in FIGS. 13A, 13B and 13C, the connecting member 32 is formed in the cuboid shape, and the upper-end bending portion 30b of the torsion bar 30 is inserted into the connecting member 32 for engagement at an offset position which is forward and downward offset from the center line CL of the connecting member 32. Further, the upper-end bending portion 30b of this embodiment is configured to be parallel to the center line CL of the connecting member 32.

Since the connecting member 32 is formed in the cuboid shape, this member 32 has four contact faces 32e, 32f, 32g, 32h which have the same shape, and the energizing force of the torsion bar 30 can be surely adjusted in four manners by rotating the connecting member 3 and thereby changing the engagement angle of the connecting member 32 with the frame portion 18g by 90 degrees each.

Since the other structures, operations, and effects of this embodiment are substantially the same as the previous embodiments (the embodiment shown in FIGS. 11 A and 11B, in particular), the same parts as those shown in FIGS. 13A, 13B and 13C are denoted by the same reference characters, and their specific descriptions are omitted here.

In the figures, an arrow F shows a vehicle forward direction, an arrow R shows a vehicle rearward direction, an arrow IN shows a vehicle inward direction, an arrow OUT shows a vehicle outward direction, and an arrow UP shows a vehicle upward direction. Further, while the right-side door support structure of the vehicle is described in the above-described embodiments, the left-side door support structure of the vehicle is configured to be symmetrical or substantially symmetrical to the right-side one.

As described above, the door support structure of the automotive vehicle of the above-described embodiments comprises the door hinge 20 pivotally supporting the door 10, the door hinge 20 being provided to slant such that the free end of the door 10 is rotated obliquely upward while the door 10 is opened, and the energizing type balancer (see the torsion bar 30) which assists the opening/closing operation of the door 10, wherein the hinge axis H of the door hinge 20 slants relative to the vertical line VER, having its upper side being positioned on the inward side in the vehicle width direction (see the inward-slant angle θ1) and on the forward side in the vehicle longitudinal direction (see the forward-slant angle θ2) such that the locus of the free end of the door 10 (see the rotational locus α) while the door 10 is opened becomes substantially horizontal or lowers in the opening direction at the point before the door 10 is opened to the maximum open position (see the fully-open position αO) (see FIGS. 2, 3 and 8).

According to the present structure, since the hinge axis H slants inward and also forward, the rise amount (lift amount) of the door's free end (see the free-end lower portion 10B) when the door is opened can be secured, so that the door can be prevented from interfering with the curb. Further, since the locus of the free end of the door 10 (the rotational locus α) while the door 10 is opened becomes substantially horizontal or lowers in the opening direction at the point before the door 10 is opened to the maximum open position (the fully-open position αO), the operational force for opening the door 10 becomes small, so that the simplification of the balancer (see the torsion bar 30) can be achieved.

Herein, the inward-slant structure of the hinge axis H particularly contributes to securing the rise amount (lift amount) of the door's free end when the door is opened, and the forward-slant structure of the hinge axis H particularly contributes to making the locus of the door's free end become substantially horizontal or lower in the opening direction at the point before the door is opened to the maximum open position.

In the embodiment of the present invention, the inward-slant angle θ1 of the hinge axis H relative to the vertical line VER is set to be within 5-15 degrees and the forward-slant angle θ2 of the hinge axis H relative to the vertical line VER is set to be within 5-15 degrees (see FIGS. 2 and 3).

According to this structure, the rise of the door's free end when the door 10 is opened and the opening operability of the door 10 can be balanced at the high level. In this connection, in the case where the inward-slant angle θ1 is less than 5 degrees, the sufficient rise amount (lift amount) of the door's free end when the door 10 is opened cannot be secured. Inversely, in the case where the inward-slant angle θ1 exceeds 15 degrees, the door opening operational force becomes so heavy that the balancer (the torsion bar 30) needs to be large-scale and also the vehicle-body structure is influenced badly, such as the cabin space being narrower.

Meanwhile, in the case where the forward-slant angle θ2 is less than 5 degrees, it is impossible to sufficiently secure the maximum open position (the fully-open position αO) until the horizontal direction. Inversely, in the case where the forward-slant angle θ2 exceeds 15 degrees, it is necessary to provide the door rotational space on the side of the front fender. Accordingly, the hinge structure to avoid the vehicle body, like the swan hinge, is required, so that the vehicle-body structure is influenced badly. Furthermore, when the door is opened, the door's free end starts lowering, without rising. Therefore, the present embodiment configured such that the inward-slant angle θ1 and the forward-slant angle θ2 are set to be within the above-described ranges can avoid the above-described various kinds of problem, thereby balancing the rise of the door's free end when the door 10 is opened and the opening operability of the door at the high level.

In the embodiment of the present invention, the balancer is made of the torsion bar 30, the torsion bar 30 being configured to take its neutral position where no torsional energizing force is generated at the top dead center (TDC) of the locus of the free end of the door 10 (the rotational locus α) (see FIGS. 2 and 3).

According to this structure, the door closing can be assisted by means of the torsional energizing force of the torsion bar 30 even when pulling back (closing) the door 10 from its maximum open position (the fully-open position αO).

In correspondence between the present invention and the above-described embodiments, the balancer of the present invention corresponds to the torsion bar 30 of the embodiments. Likewise, the locus of the door's free end corresponds to the rotational locus α, and the maximum open position corresponds to the fully-open position αO. However, the present invention should not be limited to the above-described embodiments, and any other modifications or improvements may be applied within the scope of a spirit of the present invention.

What is claimed is:

1. A door support structure of an automotive vehicle, comprising:
   a door hinge pivotally supporting a door, the door hinge positioned at a front end of the door, a hinge axis of the door hinge positioned to slant relative to a vertical line, an upper side thereof being orientated toward a vehicle body such that a rear end of the door opposite to the front end of the door is rotated obliquely upward while the door is opened; and
   an energizing type balancer having a first portion fixed to the door hinge and a second portion fixed to the vehicle body, the energizer type balancer positioned to assist an opening/closing operation of the door,
   wherein the hinge axis of said door hinge slants relative to a vertical line, having the upper side thereof oriented toward a front end of the vehicle body such that a locus of the rear end of the door while the door is opened is at a maximum vertical displacement as compared to a closed position of the door or lowers from the maximum vertical displacement in an opening direction at a point before the door is opened to a maximum open position.

2. The door support structure of the automotive vehicle of claim 1, wherein an inward-slant angle of said hinge axis relative to the vertical line is set to be within 5-15 degrees and a forward-slant angle of said hinge axis relative to the vertical line is set to be within 5-15 degrees.

3. The door support structure of the automotive vehicle of claim 1, wherein said balancer is made of a torsion bar, the torsion bar being configured to take a neutral position thereof where no torsional energizing force is generated at a top dead center or maximum vertical displacement of the locus of the free end of the door.

4. The door support structure of the automotive vehicle of claim 2, wherein said balancer is made of a torsion bar, the torsion bar being configured to take a neutral position thereof where no torsional energizing force is generated at a top dead center or maximum vertical displacement of the locus of the free end of the door.

* * * * *